(No Model.)

J. B. PITCHFORD.
ENGINE VALVE GEAR.

No. 342,036. Patented May 18, 1886.

3 Sheets—Sheet 1.

Witnesses,
Geo. H. Strong.
J. L. Nourse.

Inventor,
John B. Pitchford (No Model.) 3 Sheets—Sheet 2.

J. B. PITCHFORD.
ENGINE VALVE GEAR.

No. 342,036. Patented May 18, 1886.

Witnesses,
Geo. H. Strong.
J. H. Rouse.

Inventor,
John B. Pitchford
By Dewey & Co.
Atty

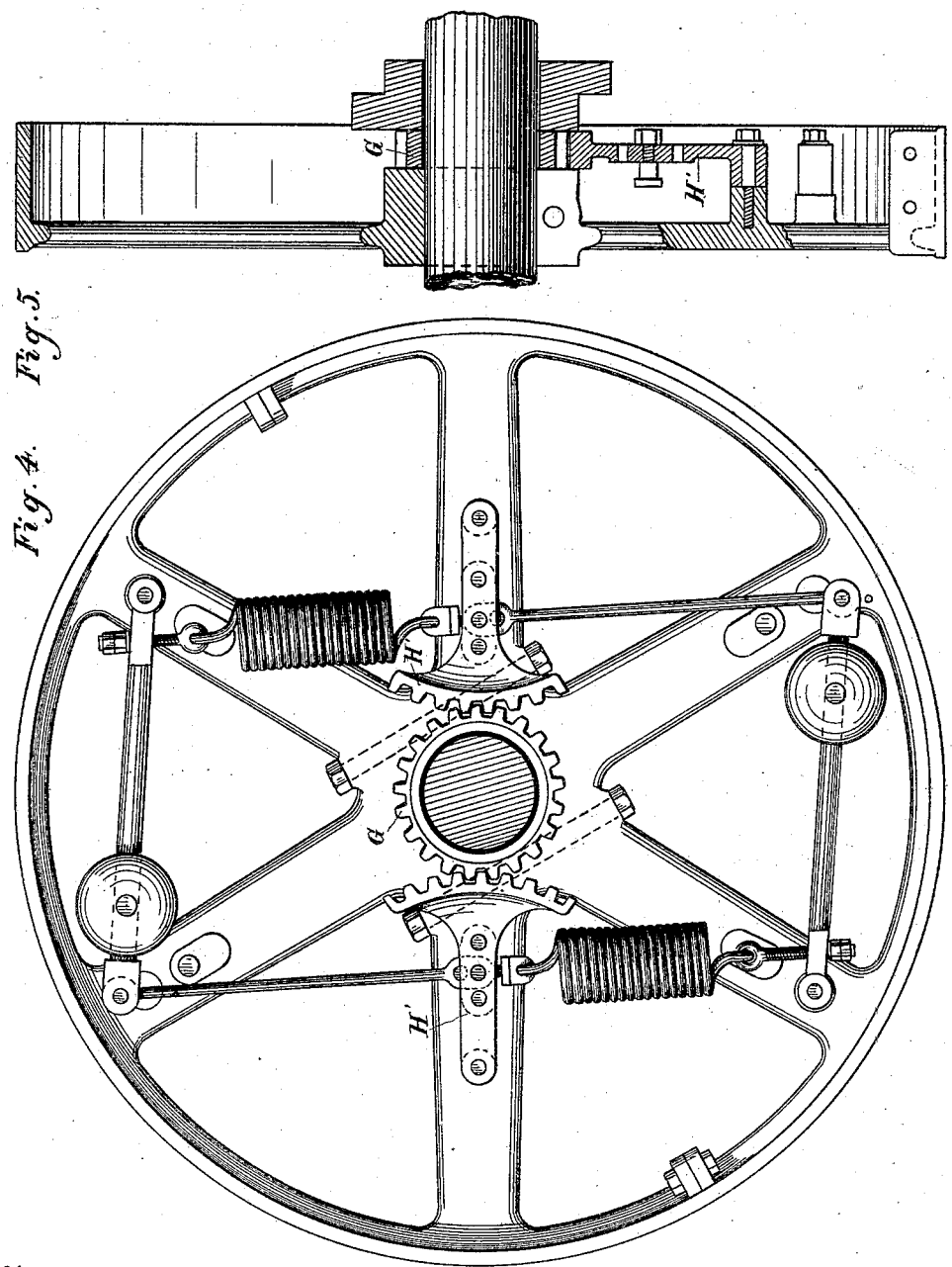

United States Patent Office.

JOHN B. PITCHFORD, OF SAN FRANCISCO, CALIFORNIA, ASSIGNOR OF ONE-HALF TO WILLIAM T. GARRATT, OF SAME PLACE.

ENGINE-VALVE GEAR.

SPECIFICATION forming part of Letters Patent No. 342,036, dated May 18, 1886.

Application filed September 22, 1885. Serial No. 177,869. (No model.)

*To all whom it may concern:*

Be it known that I, JOHN B. PITCHFORD, of the city and county of San Francisco, State of California, have invented an Improvement in Engine-Valve Gears; and I hereby declare the following to be a full, clear, and exact description of the same.

My invention relates to a mechanism for operating steam-valves, and more particularly to the non-detaching cut-off-valve gear applied to engines of the Corliss type. It consists of an equalizing-lever suspending and swinging from a point near the middle upon a pin on the arm that imparts motion to the rotary or Corliss valve, in combination with an intervening mechanism consisting of an arm, bell-crank, or disk, and a swinging link and lever connected to an eccentric which is controlled by a governor.

Figure 1:
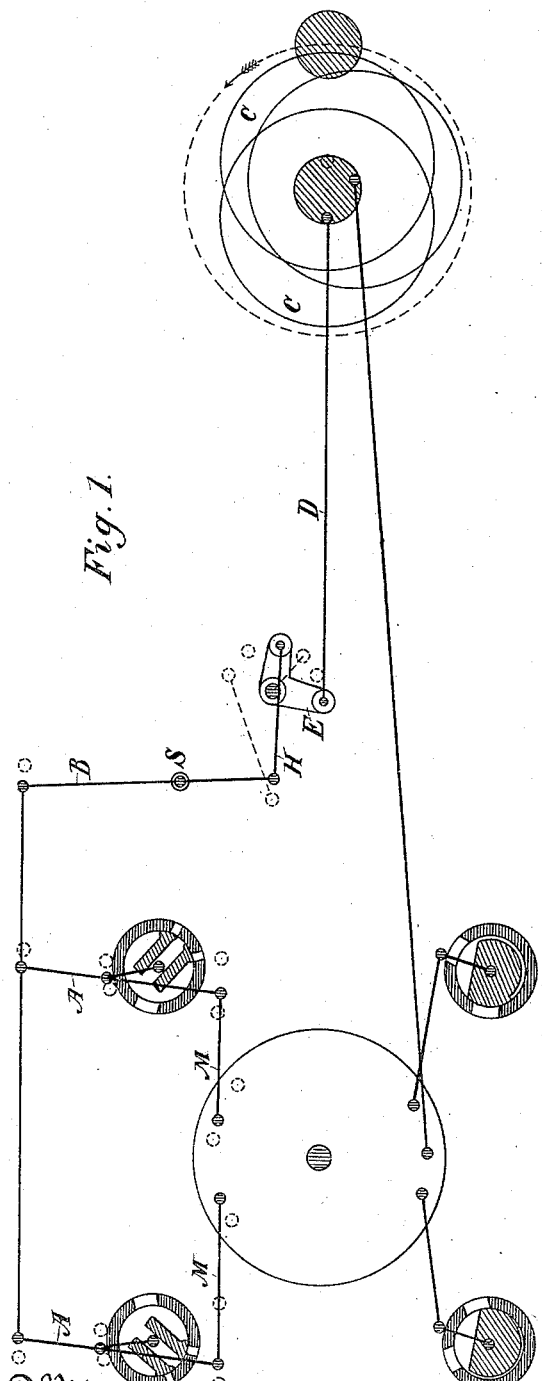
Figure 2:
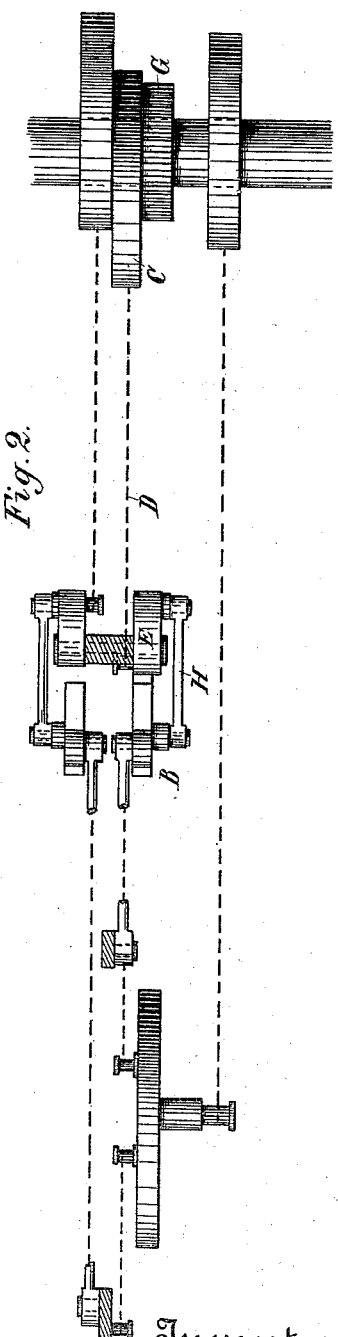
Figure 3:
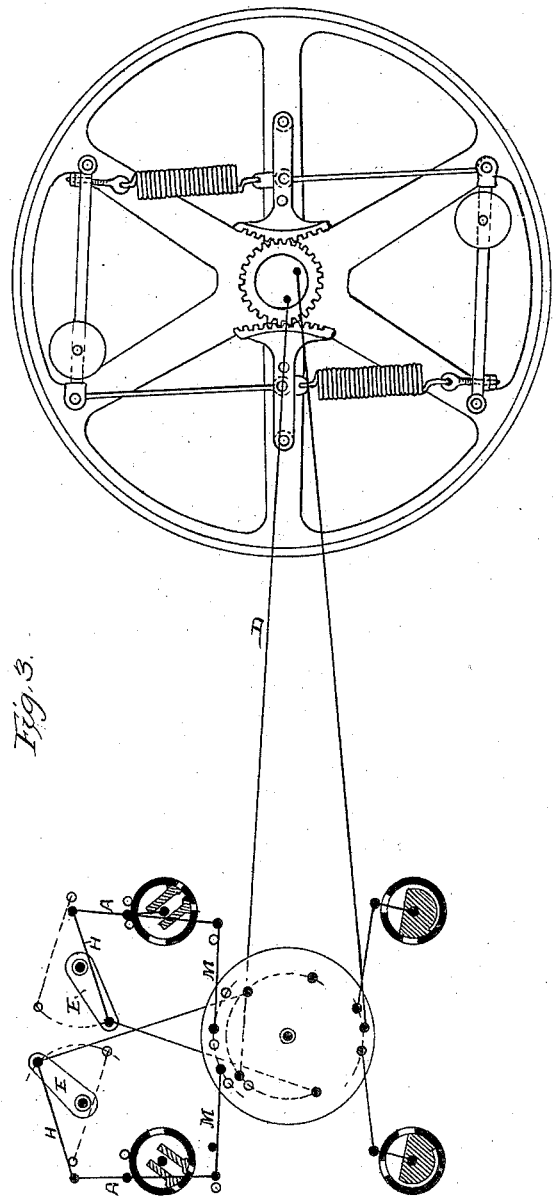

Referring to the accompanying drawings for a more complete explanation of my invention, Figure 1, Sheet 1, is a side elevation of my improvement, showing the application to a Corliss engine. Fig. 2 is a plan view of the same. Fig. 3 is a side elevation showing another method of applying my improvement to a Corliss engine. Fig. 4 is an enlarged view of the governor for controlling the position of the cut-off eccentrics, and Fig. 5 is a section through Fig. 4.

As the cut-off mechanism is the same for each steam-valve, it will only be necessary to describe its action on one valve.

A is the equalizing-lever, which is suspended from an arm fixed to the stem of the steam-valve, as shown in my patent of January 6, 1882. One end of this lever is connected to the ordinary rock-plate by a rod, M, and the other end is connected by a rod to the lever B. The lever B swings on a stationary pin at S, and a swinging link, H, connects its lower end to a pin in one arm of the bell-crank lever E. The other arm of the bell-crank E is connected to the cut-off eccentric by the rod D. The cut-off eccentrics C are attached to a pinion, G, which turns with them on a shaft driven by the engine. H' H' are segments formed at the ends of arms which are pivoted or fulcrumed to a disk or wheel at points outside the pinion G, and preferably at opposite sides, in a line which would be a continuation of its diameter. This wheel or disk is fixed to the engine-shaft, so as to revolve with it, and the exterior or convex curves of the segment are toothed so as to engage with the teeth of the pinion G. These toothed segments are connected by links with the weights of the governor, and when these weights are moved by the varying speed of the engine they impart a rotary motion to the pinion G, which moves the eccentrics to the proper position for giving the required cut-off.

It will be manifest that if the upper end of the equalizing-lever A remains stationary, the lower ends will be actuated from the rock-plate through the rods M, and the valves will thus be moved so as to admit steam in the same manner as in any ordinary Corliss or rotary valve-engine, with the exception of this cut-off. Moving the upper end of the equalizing-lever at the proper time will produce the cut-off, and this invention consists in the mechanism for accomplishing this object.

It will be seen that the cut-off eccentric C can be advanced about a quarter of a turn, or during a period of over half the stroke, without moving the lower end of the lever B a sufficient amount to materially alter the position of the steam-valve, and the reason of this is because the swinging link H, which connects the arm of the bell-crank or lever E with one end of the lever B, swings with the lever in such a manner that the end which is attached to the lever B only moves an amount equal to half the difference between the versed sine of the arc described by the lever and that of the swinging link H. This movement is so little that the main valve is not moved by the cut-off eccentric until some time after a period of half of the stroke, unless the action of the governor advances the eccentric. It will thus be seen that the last part of the arc moved through by the bell-crank imparts nearly all the motion that is given to the lever B, and this motion is comparatively rapid, so that the steam is cut off at once. By means of this device a range of cut-off can be obtained from zero to three-fourths of the stroke, while in the ordinary Corliss valve motion the cut-off does not operate after half the stroke.

Although I have here described a bell-crank as being employed intermediate between the equalizing-lever and the eccentric, it will be manifest that a disk with correspondingly-arranged pins, or an arm, as shown in Fig. 3, would produce the same result, or that various other equivalent mechanism might be employed, by which one end of the equalizing-lever may be held stationary until the valve has been opened by the action of the main eccentric or cam, after which it will be moved by the cut-off eccentric to close the valve. It will also be apparent that the relative position of the parts may be changed—as, for instance, the arm E, as shown in Fig. 3, may be connected with the equalizing-lever by the swinging link H, and the same pin is connected by a rod or link with a rock plate or disk driven by the cut-off eccentric and independent of the main rock-plate without materially changing the action or results.

The cut-off is accomplished by the difference between the radius of the arm E and that of the swinging link H after the radii begin to diverge.

Having thus described my invention, what I claim as new, and desire to secure by Letters Patent, is—

1. A lever suspended and swinging on an arm fixed to the steam-valve stem of an engine, a connection between one end of this lever and an ordinary eccentric or rock-plate, connections between the other ends of said lever and a variable or adjustable eccentric operated by a governor, and a lever interposed in said connections, between the variable connections and said lever end, whereby the position of the suspended lever is changed and accelerated motion is imparted to the valve in the latter part of its movement, substantially as described.

2. In an engine, a bell-crank or arm turning on a fixed center connected with an eccentric, by which it is caused to reciprocate, in combination with a swinging link connecting the arm, either directly or by the intervention of a secondary lever, with one end of a lever suspended and swinging on a pin connected with a steam-valve stem, said connection being such that the bell-crank or arm imparts little or no motion to the lever in the first portion of its movement, and causes accelerated motion at the last part of its movement to close the steam-valves quickly, substantially as herein described.

3. In an engine, a lever having its central portion suspended and swinging on a pin that is connected with the stem of a steam-valve, one end of said lever receiving motion from a rigid eccentric and the other end receiving motion from an adjustable eccentric, in combination with a bell-crank or arm turning on a fixed center, receiving motion from an adjustable eccentric, a second lever turning on a fixed center having one end connected with a swinging lever and the other connected by a link with the other arm of the bell-crank lever, substantially as herein described.

4. In an engine, a bell-crank lever or disk turning on a fixed center, and having a pin or pins so located with reference to this center as to swing a certain distance nearly on the same radius with that described by a swinging link which extends from the pin to a lever connected to the valve of an engine, and imparting any difference in motion to the end of the lever, so as to communicate it to the valve, substantially as herein described.

5. In an engine, a rotary valve and equalizing arm or lever having its central portion swinging upon a pin on the rocker-arm, by which the valve is moved, a fixed eccentric imparting motion to one end of the equalizing-lever through any suitable connections, another eccentric imparting motion to the opposite end of the equalizing-lever through a bell-crank arm or disk turning on a fixed center, and imparting an irregular motion to the end of the equalizing-lever, with which it is connected by means of a swinging link, one end of which is attached to the bell-crank and the other end connected with the lever, substantially as herein described.

6. In an engine, a rotary or oscillating valve having an equalizing-lever centrally suspended and swinging upon the pin of its rocker-arm, a bell-crank arm or disk and swinging link, through which motion is communicated to one end of the equalizing-lever, in combination with the eccentric or eccentrics loosely mounted upon a shaft driven by the engine, and the governor connected with said eccentric or eccentrics, and operating substantially as herein described.

In witness whereof I have hereunto set my hand.

JOHN B. PITCHFORD.

Witnesses:
S. H. NOURSE,
H. C. LEE.